(12) United States Patent
Braidic et al.

(10) Patent No.: US 11,767,679 B2
(45) Date of Patent: Sep. 26, 2023

(54) ALGORITHM FOR A POOL CLEANER

(71) Applicant: Pentair Water Pool and Spa, Inc., Cary, NC (US)

(72) Inventors: Kevin J. Braidic, Carlsbad, CA (US); John Rotundo, Carlsbad, CA (US); Daniel B. Freve, Somerville, MA (US); William Sowerwine, Somerville, MA (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

(21) Appl. No.: 17/664,828

(22) Filed: May 24, 2022

(65) Prior Publication Data
US 2022/0316228 A1 Oct. 6, 2022

Related U.S. Application Data

(63) Continuation of application No. 16/109,544, filed on Aug. 22, 2018, now Pat. No. 11,339,580.

(60) Provisional application No. 62/548,827, filed on Aug. 22, 2017.

(51) Int. Cl.
*E04H 4/16* (2006.01)
*G05D 1/02* (2020.01)
*G05D 1/00* (2006.01)

(52) U.S. Cl.
CPC ......... *E04H 4/1654* (2013.01); *G05D 1/0038* (2013.01); *G05D 1/0206* (2013.01)

(58) Field of Classification Search
CPC .......... E04H 4/1654; E04H 4/16; B25J 5/007; B25J 5/00; H04N 5/23277; H04N 13/02; G05D 1/0038; G05D 1/0206; A47L 2201/04; A47L 2201/06; G06K 9/00
USPC ..... 134/18; 348/46, 208.4, 13.004; 700/255; 15/1.7; 382/154; 901/46
See application file for complete search history.

(56) References Cited

U.S. PATENT DOCUMENTS

| | | | |
|---|---|---|---|
| 5,205,174 | A | 4/1993 | Silverman et al. |
| 5,613,261 | A | 3/1997 | Kawakami et al. |
| 6,535,793 | B2 | 3/2003 | Allard |
| 7,015,831 | B2 | 3/2006 | Karlsson et al. |

(Continued)

FOREIGN PATENT DOCUMENTS

| | | |
|---|---|---|
| CN | 101139007 A | 3/2008 |
| EP | 0811432 A2 | 12/1997 |

(Continued)

OTHER PUBLICATIONS

Extended European Search Report, European Application No. 18849210.2, dated Apr. 19, 2021, 9 pages.

(Continued)

*Primary Examiner* — Katina N. Henson
(74) *Attorney, Agent, or Firm* — Husch Blackwell LLP

(57) ABSTRACT

A pool cleaner control system is provided. The pool cleaner control system includes a pool cleaner having an imaging device and a controller. The imaging device is configured to acquire at least one image of an aquatic environment. The controller is in communication with the imaging device. The controller identifies candidate debris from the at least one image, analyzes at least two potential candidate debris-containing pathways, and determines which of the at least two potential candidate debris-containing pathways is an optimal cleaning pathway.

20 Claims, 11 Drawing Sheets

(56) References Cited

U.S. PATENT DOCUMENTS

| | | |
|---|---|---|
| 7,145,478 B2 | 12/2006 | Goncalves et al. |
| 7,162,056 B2 | 1/2007 | Burl et al. |
| 7,162,338 B2 | 1/2007 | Goncalves et al. |
| 7,177,737 B2 | 2/2007 | Karlsson et al. |
| 7,188,000 B2 | 3/2007 | Chiappetta et al. |
| 7,272,467 B2 | 9/2007 | Goncalves et al. |
| 7,459,871 B2 | 12/2008 | Landry et al. |
| 7,539,557 B2 | 5/2009 | Yamauchi |
| 7,573,403 B2 | 8/2009 | Goncalves et al. |
| 7,679,532 B2 | 3/2010 | Karlsson et al. |
| 7,689,321 B2 | 3/2010 | Karlsson |
| 7,774,158 B2 | 8/2010 | Domingues Goncalves et al. |
| 8,086,419 B2 | 12/2011 | Goncalves et al. |
| 8,095,238 B2 | 1/2012 | Jones et al. |
| 8,095,336 B2 | 1/2012 | Goncalves et al. |
| 8,150,650 B2 | 4/2012 | Goncalves et al. |
| 8,274,406 B2 | 9/2012 | Karlsson et al. |
| 8,506,719 B2 | 8/2013 | Holappa et al. |
| 8,634,958 B1 | 1/2014 | Chiappetta et al. |
| 8,972,052 B2 | 3/2015 | Chiappetta |
| 8,972,061 B2 | 3/2015 | Rosenstein et al. |
| 9,086,274 B2 | 7/2015 | Leonessa et al. |
| 9,144,361 B2 | 9/2015 | Landry et al. |
| 9,329,598 B2 | 5/2016 | Pack et al. |
| 9,375,847 B2 * | 6/2016 | Angle ............... H04L 12/282 |
| 9,388,595 B2 | 7/2016 | Durvasula et al. |
| 9,701,020 B1 * | 7/2017 | Ebrahimi Afrouzi ....................... G05D 1/0274 |
| 11,124,982 B2 | 9/2021 | Korenfeld et al. |
| 11,306,500 B2 | 4/2022 | Pichon |
| 2004/0040581 A1 | 3/2004 | Bruwer |
| 2010/0307545 A1 | 12/2010 | Osaka et al. |
| 2011/0035053 A1 | 2/2011 | Guochunxu et al. |
| 2012/0182392 A1 | 7/2012 | Kearns et al. |
| 2013/0116826 A1 | 5/2013 | Kim et al. |
| 2013/0152970 A1 | 6/2013 | Porat |
| 2013/0206177 A1 | 8/2013 | Burlutskiy |
| 2014/0015959 A1 | 1/2014 | Durvasula |
| 2014/0028861 A1 | 1/2014 | Holz |
| 2014/0257622 A1 | 9/2014 | Shamlian et al. |
| 2014/0263087 A1 | 9/2014 | Renaud et al. |
| 2014/0289991 A1 | 10/2014 | Landy et al. |
| 2015/0105964 A1 | 4/2015 | Sofman et al. |
| 2015/0197012 A1 | 7/2015 | Schnittman et al. |
| 2015/0205299 A1 | 7/2015 | Schnittman |
| 2015/0212521 A1 | 7/2015 | Pack et al. |
| 2015/0267433 A1 * | 9/2015 | Leonessa ............. G01C 15/002 701/28 |
| 2016/0244988 A1 | 8/2016 | Barcelos et al. |
| 2016/0319559 A1 | 11/2016 | Durvasula et al. |
| 2016/0375592 A1 | 12/2016 | Szatmary et al. |

FOREIGN PATENT DOCUMENTS

| | | |
|---|---|---|
| EP | 2607573 A2 | 6/2013 |
| WO | 2012023676 A1 | 2/2012 |
| WO | 20140151267 A1 | 9/2014 |
| WO | 2014004929 A9 | 8/2015 |
| WO | 2016137886 A1 | 9/2016 |
| WO | 2017055737 A1 | 4/2017 |

OTHER PUBLICATIONS

International Search Report and Written Opinion, for corresponding International Application No. PCT/US/2018/047583, dated Nov. 19, 2018, 12 pages.

* cited by examiner

FIG. 5
FIG. 4
FIG. 6

ALGORITHM FOR A POOL CLEANER

CROSS-REFERENCE TO RELATED APPLICATIONS

This application is a continuation application of U.S. patent application Ser. No. 16/109,544, filed Aug. 22, 2018, and further claims the benefit of, and priority to, U.S. provisional patent application No. 62/548,827, filed Aug. 22, 2017, which is incorporated herein by reference.

BACKGROUND OF THE INVENTION

A number of different automatic pool cleaners exist. Most automatic pool cleaners include one or more components for driving the pool cleaner along a floor and sidewalls of a swimming pool. For example, conventional pressure side cleaners and suction cleaners often use hydraulic turbine assemblies as drive systems to drive one or more wheels. Water supplied through the pool cleaner drives the turbine assemblies, which in turn, drive the wheels. Robotic pool cleaners have also been developed that utilize a motor instead of water to drive the pool cleaners.

Most existing pressure and suction side cleaners and some robotic pool cleaners operate according to random algorithms. In other words, the path of the pool cleaner is random. Some robotic cleaners are operated in a more deliberate manner utilizing a control algorithm, but many of such control algorithms do not function to clean a swimming pool much better than the random algorithms.

SUMMARY OF THE INVENTION

Embodiments of the invention provide a pool cleaner control system. The pool cleaner control system includes a pool cleaner having an imaging device and a controller. The imaging device is configured to acquire at least one image of an aquatic environment. The controller is in communication with the imaging device. The controller identifies candidate debris from the at least one image, analyzes at least two potential candidate debris-containing pathways, and determines which of the at least two potential candidate debris-containing pathways is an optimal cleaning pathway.

Some embodiments provide a method of determining a path for a pool cleaner including an imaging device. The method includes the steps of acquiring one or more images in an aquatic environment using the imaging device, analyzing the one or more images to identify debris, identifying at least two potential debris-containing pathways in the aquatic environment based on the identified debris, determining which of the at least two potential debris-containing pathways is an optimal cleaning pathway, and navigating the pool cleaner to remove the debris along the optimal cleaning pathway.

BRIEF DESCRIPTION OF THE DRAWINGS

FIG. 4 is an image depicting an inverted saturation channel extracted from an image or video taken of an aquatic environment;

FIG. 5 is an image depicting a blue channel extracted from an image or video taken of the aquatic environment;

FIG. 6 is an image depicting a linear combination of the inverted saturation and blue channels of FIGS. 4 and 5;

DETAILED DESCRIPTION OF THE INVENTION

Figure 1A:
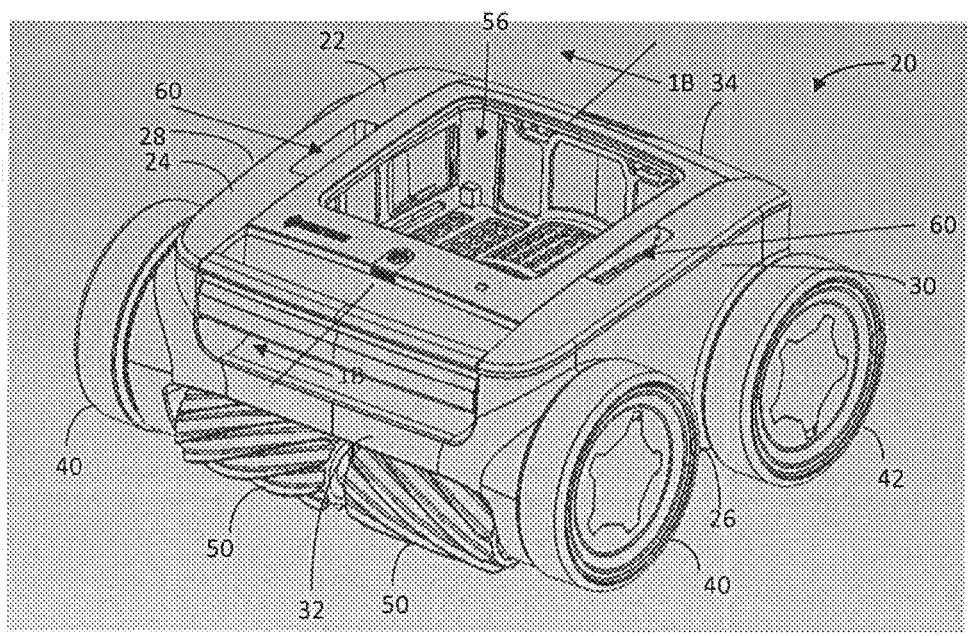
FIG. 1A is a top isometric view of an exemplary robotic pool cleaner that may implement control algorithms disclosed herein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention provide a cleaning vehicle for operation in enclosed aquatic environments. More specifically, embodiments of the invention provide control algorithms for operation of an autonomous robotic pool cleaner for operation in aquatic environments, for example, swimming pool and/or spa environments. The control algorithms utilizes images or videos to determine target or candidate debris for removal. The control algorithm allows the pool cleaner to target and collect debris, rather than roaming aimlessly and randomly throughout the aquatic environment, thereby traversing and cleaning the entire aquatic environment in a shorter period of time.

Figure 1B:
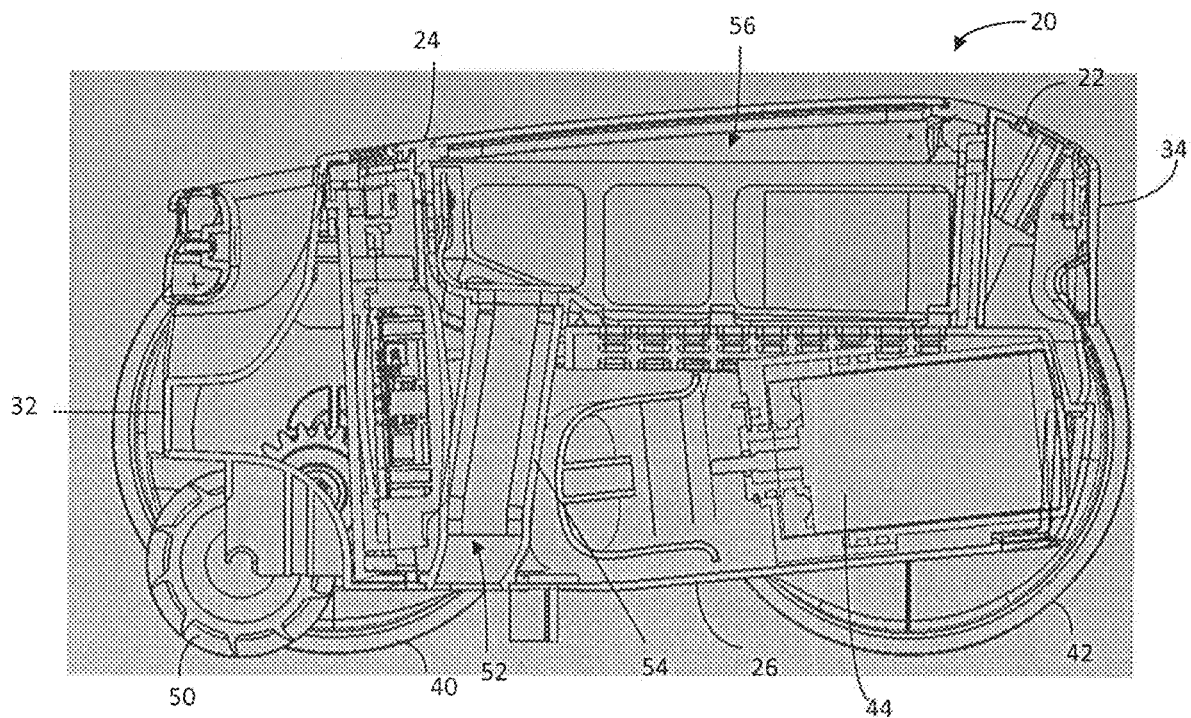
FIG. 1B is a cross-sectional view taken generally along the lines 1B-1B of FIG. 1A and depicting exemplary internal components and features of the robotic pool cleaner of FIG. 1A.

FIGS. 1A and 1B illustrate an exemplary pool cleaner 20 that may implement the control algorithms disclosed herein. In some embodiments, the pool cleaner 20 may include a housing 22 having a plurality of walls, for example, a top wall 24, a bottom wall 26, a first side wall 28, a second side wall 30, a front wall 32, and a rear wall 34, that all form a generally rectangular shape. In other illustrative embodiments, the housing 22 may have any suitable number of walls and/or may have any suitable shape. While directional terminology is utilized herein (e.g., front, rear, forward, backward, etc.), such terminology is used to describe components or features in relation to one another and is not intended to be limited. For example, the walls 32, 34 are described as being front and rear walls, but one skilled in the art will understand that the robotic pool cleaner 20 is capable of moving in a first direction in which the front wall 32 is facing a direction of travel, but the pool cleaner 20 may also be reversed such that the rear wall 34 is facing a direction of travel.

In some embodiments, the pool cleaner 20 includes a plurality of wheels, for example, a set of front wheels 40 and a set of rear wheels 42, each of which are driven by a drive system (not shown). One front wheel 40 and one rear wheel 42 are operatively coupled to the first side wall 28 and one front wheel 40 and one rear wheel 42 are operatively coupled to the second side wall 30. Each of the wheels 40, 42 is driven by a drive system. The drive system may include, for example, a plurality of axles, gears, and/or other components that are operatively connected to, for example, a motor 44 that provides rotational energy to the axles, gears, and/or other components. In other embodiments, the pool cleaner 20 may be pressure or suction driven, in which case, the pool cleaner 20 may include a turbine or other fluid directing device that controls a flow of water through the pool cleaner 20 to rotate the wheels 40, 42. In the embodiment depicted in FIG. 1A, four wheels are disclosed. In other embodiments, the pool cleaner 20 may include two wheels, three wheels, or no wheels at all. In embodiments with no wheels, the pool cleaner 20 may traverse the aquatic environment via elongate treads, tracks, or other components that facilitate locomotion.

Still referring to FIGS. 1A and 1B, the pool cleaner 20 may additionally include a front set of scrub brushes 50 and/or a rear set of scrub brushes (not shown) that assist in moving debris from a surface to be cleaned into an inlet 52 that is positioned behind the front set of scrub brushes 50 and in front of the rear set of scrub brushes. The scrub brushes may also be provided as a single brush as opposed to two discrete sections. In some embodiments, debris and water are pulled through the inlet 52, into an inlet tube 54, and into a filter canister 56. The filter canister 56 collects debris and the water (without debris) is exhausted from the pool cleaner 20, for example, through one or more outlets 60 in the top wall 24 of the pool cleaner 20. In other embodiments, the one or more outlets may be positioned in any wall of the pool cleaner 20. In a further embodiment, the pool cleaner 20 may include a debris bag (not shown), or other internal or external debris capturing element.

While a particular pool cleaner 20 and variations thereof are described herein, it should be understood that the principles of the present invention may be implemented within any pool cleaner. For example, the principles of the present invention may be implemented within a suction or pressure side pool cleaner, within a pool cleaner having different components, features, and/or functions than the pool cleaner 20 described herein, or any other suitable pool cleaner.

Figure 2:
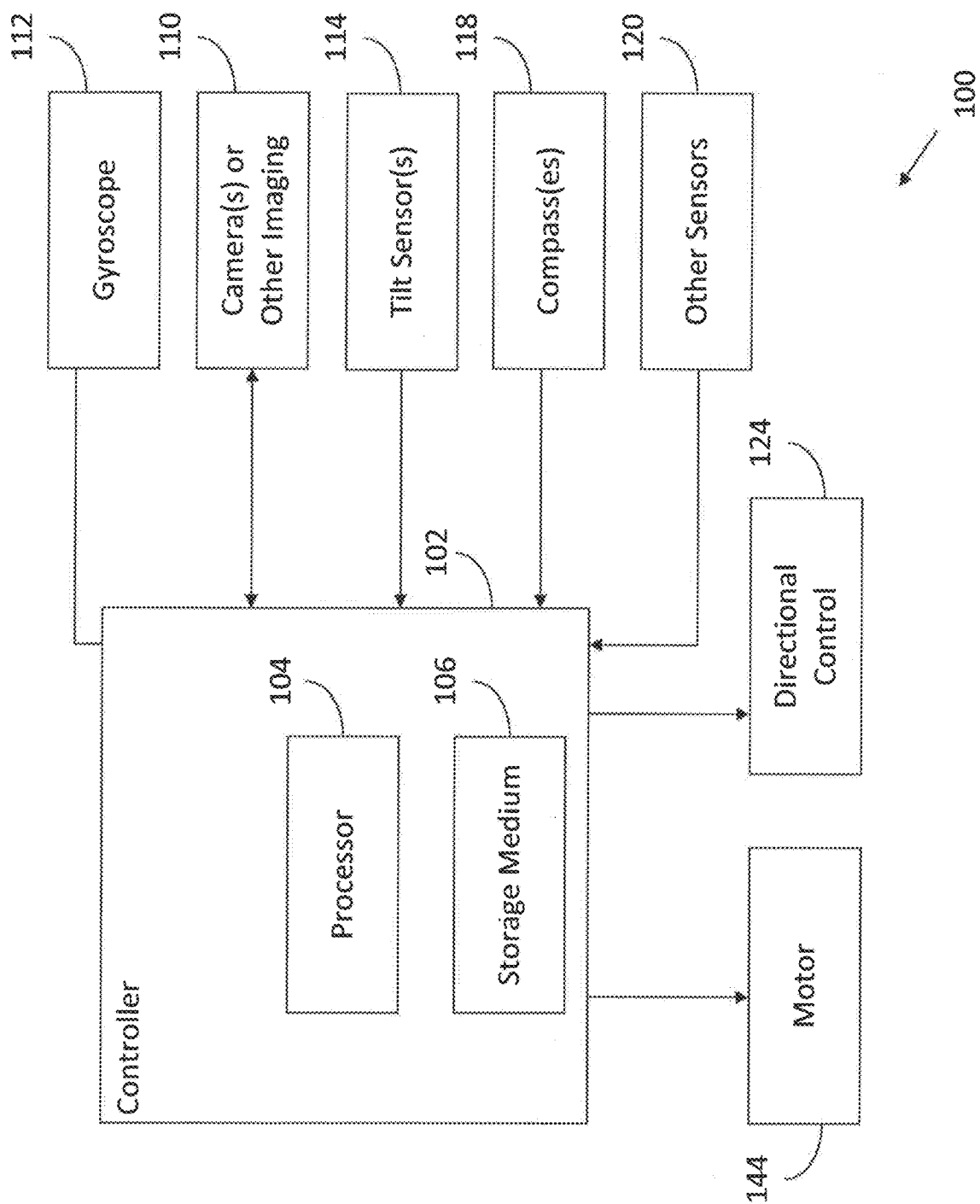
FIG. 2 is an exemplary diagram of a control system or module for a pool cleaner implementing one or more control algorithms of the present invention.

As best seen in FIG. 2, the pool cleaner 20 may further include a control module or system 100 that includes a controller 102 and other components, as discussed in more detail below, for operating the pool cleaner 20. The control algorithms may be implemented within the control module or system 100 and may operate one or more features and/or components of the pool cleaner 20 and/or the control module or system 100 may receive feedback from one or more components to operate the control algorithms to operate the pool cleaner 20 or to operate other components, functions, and/or features of the pool cleaner 20. One or more elements of the control system 100 may be provided in a substantially water tight enclosure.

The control system 100 may include the controller 102, such as a central processing unit ("CPU"), a graphics processing unit ("GPU"), or both, a processor 104, memory 105, a storage medium 106 (e.g., a database (not shown)), and/or any other suitable components (e.g., an input/output device, a display unit, a network interface device, a disk drive, etc.). The processor 104 may be, for example, a microprocessor, a microcontroller, digital signal processor, or any other suitable processor. The processor 104 is communicatively coupled to the memory 105. The memory 105 may be embodied as any type of suitable computer memory device, including fixed and/or removable memory devices (e.g., volatile memory such as a form of random access memory or a combination of random access memory and read-only memory, such as memory cards, e.g., SD cards, memory sticks, hard drives, and/or others). Program code, for example, the control algorithms disclosed herein, may be stored within the memory 105 and/or on the storage medium 106. The program code can be executed by the processor 104 to perform various operations, as will be discussed in more detail below.

The control system 100 may further include any number of suitable components for providing feedback to the controller 102 and/or to which the control system provides instructions. Exemplary components that provide feedback or information to the control system 100 include, but are not limited to, one or more imaging devices 110 configured to capture video or images of the aquatic environment (for example, one or more of a camera or image sensor, a video camera, and/or any other suitable imaging device). In some embodiments, one or more imaging devices may be mounted on the housing 22 of the pool cleaner 20, for example, at a front edge. In other embodiments, the imaging device may be mounted on other portions of the pool cleaner 20 and extend upwardly from the top wall 24. The imaging device is designed to be positioned in a location where debris in the aquatic environment may be sensed and recorded.

The imaging device 110 is designed to capture images of objects submerged within the aquatic environment. In some embodiments, the imaging device may be mounted on the outer surface of the housing 22 of the pool cleaner 20. In other embodiments, the imaging device 110 is mounted inside the housing 22 of the pool cleaner 20. In some instances, the imaging device 110 is mounted on a handle of the pool cleaner 20. In some embodiments, the imaging device is a camera and includes an image sensor. In one instance, the camera is manufactured by Omnivision Technologies (Santa Clara, Calif.) and is provided under the model OV09732-H35A. The camera and/or the image sensor may be provided in a waterproof case (not shown). Data from the camera and/or the image sensor may be processed via Raspberry Pi Compute Module 3 with custom written software for image processing.

The control system 100 may also include one or more gyroscopes 112, one or more tilt sensors 114, one or more accelerometers (not shown), one or more compasses 118, one or more other sensors 120, one or more inclinometers (not shown), or any other components that can provide feedback, for example, about the pool cleaner 20 and/or the environment around the pool cleaner 20.

Additionally, the controller 102 is capable of sending instructions to the imaging device 110, for example, to change an angle or viewing area of the imaging device 110 or to perform other functions. In some embodiments, the controller 102 may be in communication with the imaging device 110 and may also send instructions to the imaging device 110 to continuously collect images of an aquatic environment. The controller 102 may also send instructions to the motor 44 to control operation of the pool cleaner 20, to a directional control 124 to control movement of the pool cleaner 20, and/or to any other components of the pool cleaner 20 to control any operation of the pool cleaner 20. The controller 102 may also receive data from any of the components of the pool cleaner 20, for example, regarding function of those components (e.g., fault or other conditions).

The control module or system 100 may be further connected to a network (not shown), such that the control module or system 100 can communicate with remote devices, for example a computer, a mobile device, control modules or systems of other pool cleaners, or any other suitable devices. In this manner, instructions may be provided to the control module or system 100 to control various aspects of the pool cleaner 20. In an exemplary embodiment, a mobile device (e.g., by means of an application on the mobile device) may be utilized to turn the pool cleaner on and off, control movement of the pool cleaner 20, control the operational schedule of the pool cleaner 20, and/or control any other components, functions, or features of the pool cleaner 20.

The control system 100, through the controller 102, implements one or more algorithms that are intended to optimize cleaning paths, trajectories, or routes within an aquatic environment, for example a pool, by identifying specific locations of debris within the aquatic environment and determining a best path to take based on size and location of debris along each potential path and a smoothness of each potential path. During a cleaning operation, the control system 100 continuously evaluates different paths and takes the best path at each evaluation until the entire aquatic environment is clean or until the pool cleaner 20 is turned off. In this manner, the time necessary to clean the aquatic environment is much less than conventional pool cleaners.

Figure 3:
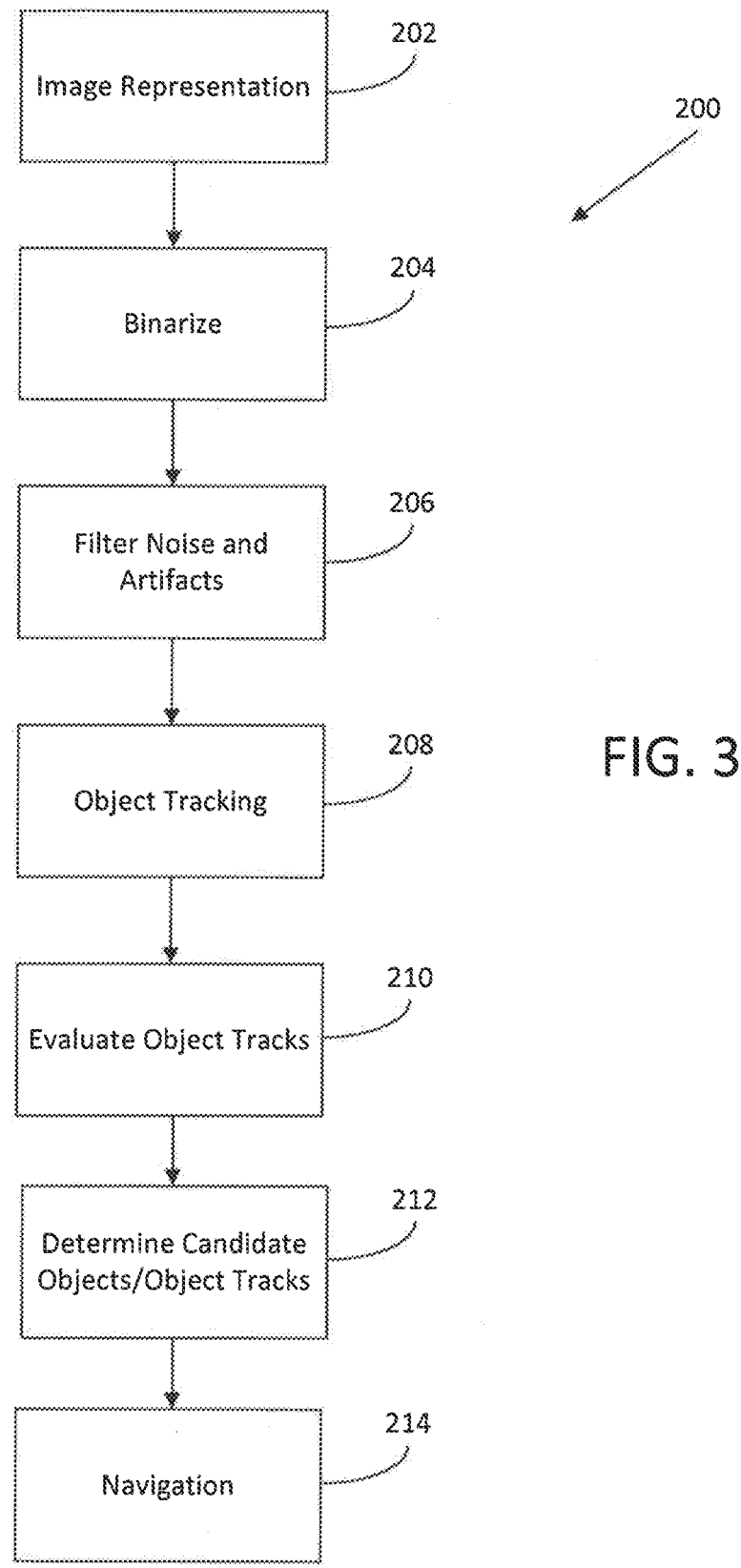
FIG. 3 is flow diagram depicting steps implemented by one or more control algorithms of the present invention.

In a first embodiment of a control algorithm 200 depicted in FIG. 3, as the pool cleaner 20 moves about the aquatic environment, the imaging device 110 is constantly collecting images of the aquatic environment (e.g., at 2 images per second, at 5 images per second, at 10 images per second, at more than 10 images per second, or any other suitable interval). In some embodiments, the imaging device 110 acquires at least one primary image of the aquatic environment. The controller 102 receives the at least one primary image from the imaging device 110. At a high level, the algorithm of FIG. 3 identifies any number of candidate (or potential) paths it may take, identifies all debris objects on each candidate path, scores each path as a function of debris, applies penalties (as discussed more below), and chooses the candidate path with the best path score. As will be discussed in more detail below, the algorithm performs these steps for each image that is collected, which means that a different path could be chosen at any point in time. In some embodiments, the algorithm creates a secondary image with enhanced contrast from the primary image, binarizes the secondary image to create a tertiary image with black and white contrast, filters out noise and artifacts from the tertiary image to identify objects to be removed from the aquatic environment, tracks the objects to be removed from the aquatic environment and determines in what order the objects may be removed from the aquatic environment.

Prior to step 202 of FIG. 3, a white balance and gain adjustment of the imaging device 110 is performed dynamically, which assists in compensating for varying environmental conditions, for example, differing degrees of brightness (e.g., bright sunny days versus indoor pools, etc.). At step 202, for each image that is generated of the aquatic environment, saturation (FIG. 4) and blue channels (FIG. 5) are extracted, thereby creating contrast between a structural environment (e.g., the pool walls and/or surfaces 150 of the aquatic environment) and debris within the pool 152 or other aquatic environment. A linear combination of saturation and blue channels is thereafter created, as seen in FIG. 6. The result of the linear combination of the saturation and blue channels of the image is an image with enhanced contrast. In some embodiments, a first designated percentage is assigned to the saturation channel extracted from each image. In some embodiments, a second designated percentage is assigned to the blue channel. In some embodiments, a first designated percentage of the saturation channel is combined with a second designated percentage of the blue channel, with a total of the first and second designated percentages being 100%, thereby creating the linear combination.

Once the linear combination image with enhanced contrast is created, at step 204 of FIG. 3, the linear combination image is binarized. More particularly, each pixel in the linear combination image has a value (of 0 to 255) that represents its brightness. When the linear combination image is binarized, each pixel above a threshold is changed to white and each pixel below the threshold is changed to black. In some embodiments, when the secondary image is binarized, a tertiary image is created having black and white contrast. In some embodiments, the threshold is between about 100 and about 200. In some embodiments, the threshold is about between about 125 and about 175. While particular thresholds are disclosed herein, it should be understood that the threshold is dynamic for different portions of one image and from image to image. More particularly, there is a local background correction that is performed in order to determine a more optimal threshold value for different regions within one image. The background correction feature assists in equalizing sections within an image that contain different regions having different characteristics (e.g., bright and dark areas).

Figure 7:
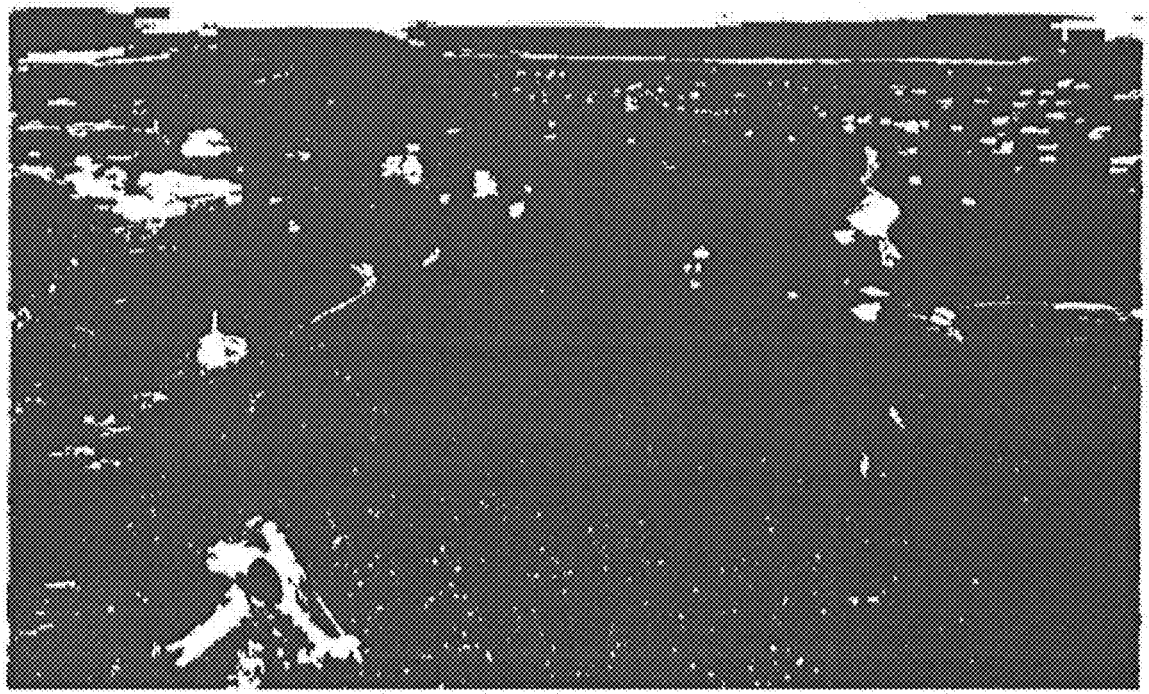
FIG. 7 is an image depicting binarization of the linear combination image of FIG. 6.

In other embodiments, the threshold may be customizable, for example, the pool cleaner 20 may include a user interface or may be programmable through, for example, an application on a mobile device, whereby a user may select a threshold size. In still other embodiments, the user may input, for example, through a user interface, a pool surface type (e.g., vinyl, concrete, etc.) and the control algorithm 200 automatically sets the thresholds (and/or additional filters, weights, and/or other parameters used in other processing steps). In still other alternative embodiments, the control algorithm 200 may detect a pool surface type and/or environmental conditions and automatically adjusts the threshold and/or other parameters. In this manner, based on the particular aquatic environment, a user may select a different threshold. In this step, the binarization creates a binarized image, as seen in FIG. 7, and provides for further contrast of debris 152 from the structural environment 150, which can assist in isolating debris 152 (shown in white in FIG. 7) and also assists in increasing the efficiency of later mathematical operations (e.g., in calculating a path score), as discussed in more detail below.

Figure 8:
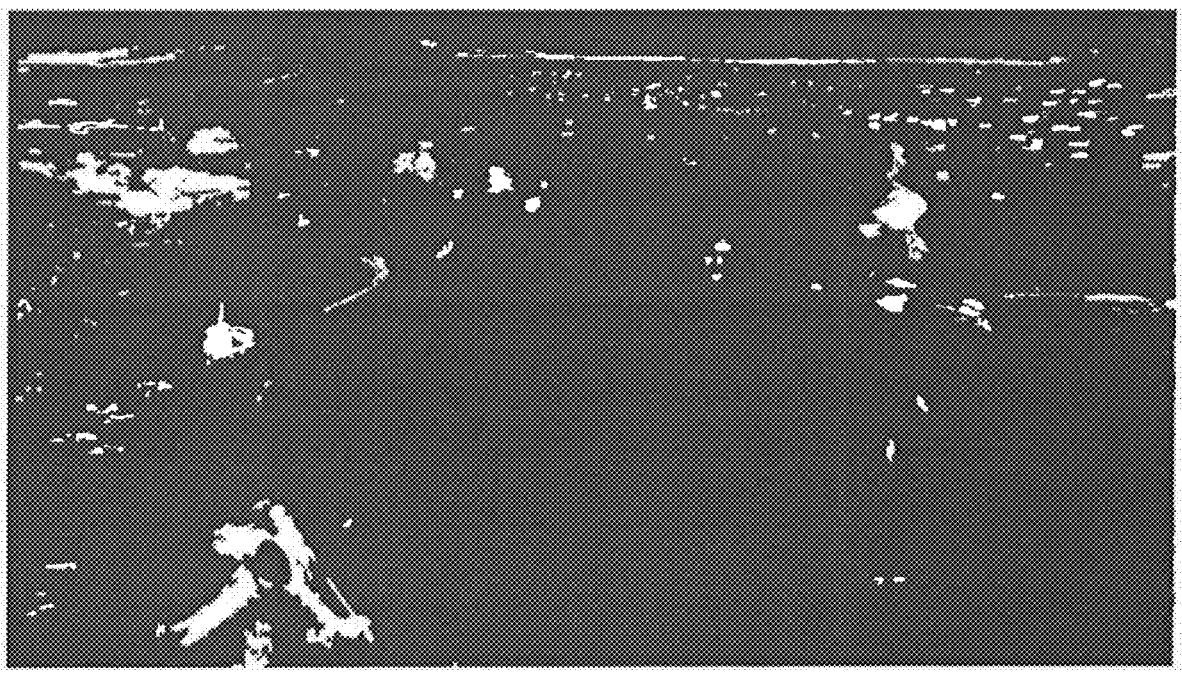
FIG. 8 is an image in which objects smaller than a threshold size have been filtered out (i.e., turned to black) of the binarized image of FIG. 7.

Referring again to FIG. 3, at step 206, transient noise and other artifacts are filtered out of the binarized image. More particularly, objects smaller than a threshold size are filtered out of the binarized image and are, thus, changed to black in the binarized image. As seen in the difference between FIGS. 7 and 8, smaller objects 156 (see FIG. 7) have been filtered out (turned to black) in the binarized image to create a filtered image (FIG. 8). The threshold size depends on the pool surface type and/or sensor resolution. For example, with a Pebble Tec® surface, the threshold size may be about 5 millimeters. In aquatic environments utilizing concrete or vinyl, a much lower threshold size may be utilized. In other embodiments, the threshold size may be customizable, for example, the pool cleaner 20 may include a user interface or may be programmable through, for example, an application on a mobile device, whereby a user may select a threshold size. In this manner, based on the particular aquatic environment, a user may select a different threshold size. For example, in a situation where the aquatic application includes a design on a surface of the aquatic application, the threshold size may be set to be larger than in an aquatic environment with no design.

Removal of smaller objects (to create the filtered image of FIG. 8) helps to remove artifacts, such as textured pool surfaces, pool designs or finishes (e.g., Pebble Tec®, etc.), spots created by water surface movement, or any other non-debris items within the aquatic environment. The removal of smaller objects also removes noise, for example, electrical noise in the imaging device (i.e., errors in the signals). In this manner, the control algorithm removes anything from the binarized image that could be confused as being debris, but is not debris. The real-world size of debris may be determined by using a standard checkerboard calibration algorithm.

Figure 9:
FIG. 9 is identical to the image of FIG. 8 with first and second objects to be tracked highlighted (i.e., circled)
Figure 10:
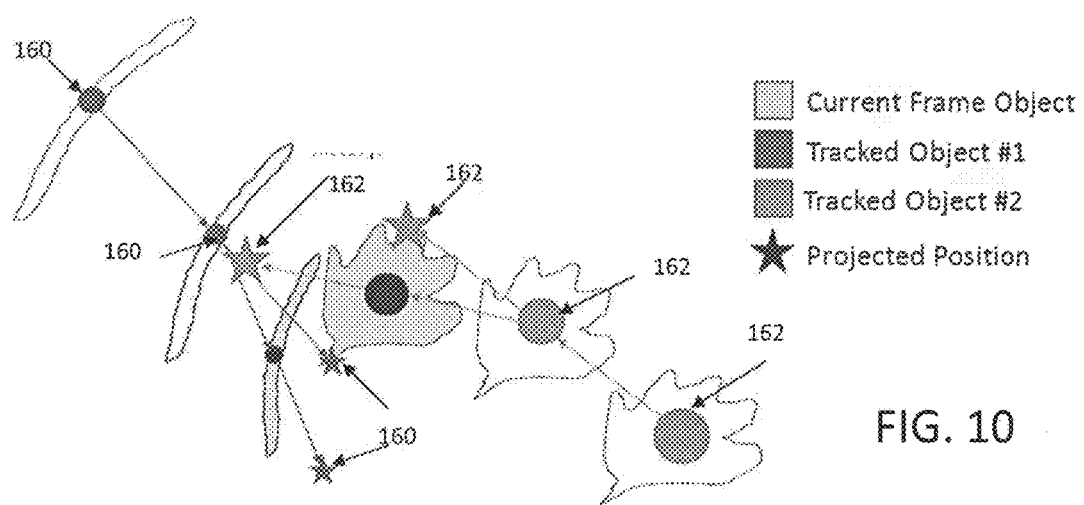
FIG. 10 is a diagram depicting an exemplary tracking of the first and second objects of FIG. 9.

At step 208 of FIG. 3, objects are tracked utilizing the filtered image (of FIG. 8). Referring to FIG. 9, as the pool cleaner 20 moves forward, it would be expected that larger objects, such as first object 160 and second object 162 of FIG. 9, would move downward and to the left in each subsequent captured image (after steps 202, 204, and 206 of FIG. 3). This expectation can be utilized to distinguish between actual debris and transient noise and artifacts. An example tracking operation of objects is depicted in FIG. 10. In FIG. 10, the first tracked object 160 is shown in red and the second tracked object 162 is shown in blue (both from FIG. 9). The circles for each tracked object represent the actual positions of the tracked objects and the stars for each tracked object represent a projected or anticipated position (sometime in the future) for each of the tracked objects. Referring to the first tracked object 160, the original path is shown as 160a with the projected path of the first tracked object 160 shown labeled 160a. In some circumstances, the first tracked object 160 may not follow the projected path. In FIG. 10, the first tracked object 160 does not follow the projected path and, instead, veers of course to the position indicated by 160b and a new projected path is calculated (as shown by the star labeled 160b). The control algorithms of the present invention determine whether the shift off the projected or anticipated path warrants elimination of the tracked object as debris or retention of the tracked object as debris.

Figure 11:
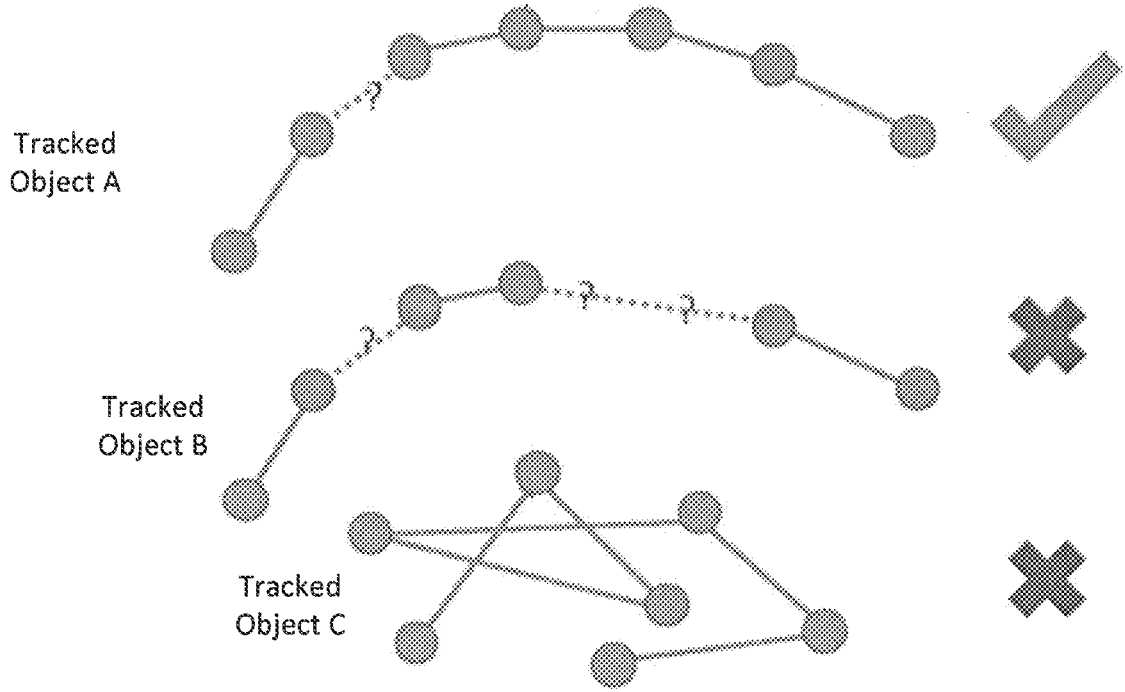
FIG. 11 is a diagram depicting objects that are moving along a consistent or projected path (for which the tracks are retained) and others that are moving along an erratic or inconsistent path (for which the tracks are discarded)

Tracked objects are then evaluated at step 210 of FIG. 3. If, as seen in FIG. 11, a tracked object appears to be moving along a consistent or expected trajectory, the track or path of the tracked object is identified as being a high quality track, for example, as seen with Tracked Object A. If data for a tracked object is missing, such that it is possible that the control system has picked up data for more than one object or picked up data for something that is not debris, the track or path for the tracked object is discarded, for example, as seen with Tracked Object B. Additionally, if data for a tracked object is erratic (e.g., not following along a consistent or expected trajectory), the tracked object is likely not debris, as it is likely not a static object on a surface of the pool, and thus, the track or path for the tracked object is discarded, for example, as seen with Tracked Object C. This method of removing tracked objects with an erratic track or path assists in removing effects caused by, for example, erratic sun spots from surface ripples and other lighting effects. If a tracked object is moving too much in the aquatic environment, it is possible that the tracked object is still debris, but is moving enough that its track or path is removed. In this case, if the tracked object remains in the aquatic environment, the tracked object may be again recognized as potential debris, but the control algorithm may determine it is different from the original tracked object and will begin tracking it as a separate object.

Figure 13:
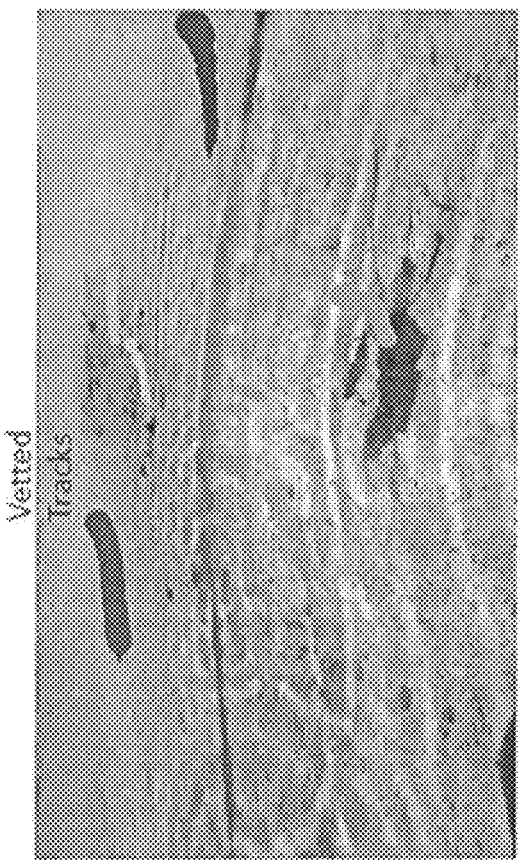
FIG. 13 is an image similar to that of FIG. 12 with some of the tracks removed or discarded after utilizing the method generally discussed with regard to FIG. 11.
Figure 12:
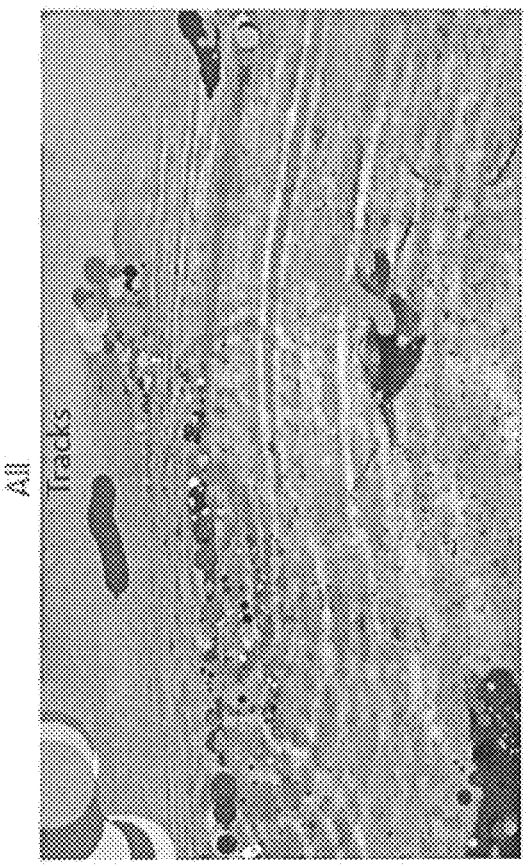
FIG. 12 is an image including numerous tracks that depict paths of various objects within the aquatic environment.

The result of the evaluating and removal (or retention) of various tracks or paths for tracked objects is depicted in FIGS. 12 and 13. More particularly, FIG. 12 depicts all tracks (in various colors throughout the image) and FIG. 13 depicts a vetted version of the image of FIG. 12 with various tracks or paths removed (through the evaluation step 210 of FIG. 3). In this manner, only candidate debris remains, the candidate debris representing objects to the control system 100 and is identified as debris that need to be removed. Once the tracks are evaluated at step 210 of FIG. 3, the control algorithm determines which path to take to remove remaining debris (i.e., candidate debris) at step 212 and navigates the pool cleaner 20 along the selected path to the candidate debris at step 214. The determination of which path or trajectory to take at step 212 will be discussed in more detail below.

The step of determining which path or trajectory to take and thus, which candidate debris to remove next is evaluated at step 212 of FIG. 3. The step of includes a number of sub-steps to determine which of a possible set of paths should be taken. More particularly, for each path, debris information that lies on a current path is selected, a clustering logic is optionally applied to condense dense debris into fewer, large objects for purpose of evaluating a path score, and each path is scored according to the following equation:

$$score_j = [\Sigma_i f(A_i) g(d_i)] p(\Delta\theta_j)$$

The path score is a mathematical formulation that determines the best path, trajectory, or route to take in order to collect candidate debris. The score is based in part on a current location of the pool cleaner 20 and the locations of the candidate debris in the field of view of the imaging device 110. The path score is calculated for each potential path. The control algorithm is continuously making these path score calculations (for each image that is taken and manipulated per steps 202 through 210 of FIG. 3) to determine whether to stay on the current path or change its course to a different path.

In the path score, the sum is over debris information for the current path, j. Each of the different components of the equation for determining a path score for a path will now be discussed in more detail.

$$f(A_i) = \left(\frac{A_i}{\alpha}\right)^k$$

$f(A_i)$ represents a size and density of a candidate piece of debris, with $A_i$ representing the size and density of the candidate piece of debris, $\alpha$ being a characteristic size scale, and k being a term that adjusts the priority of large debris. Where k≥1, k is a real number. For k=1, there will be a linear scaling of size information. For k>1, large objects will be favored more than linearly over small objects. For k>>1, large objects will be favored to the exclusion of small objects. $\alpha$ is a constant that is selected to be a typical characteristic size for debris removal. $\alpha$ is only relevant for k>1. For k>1, objects with an area <$\alpha$ will be penalized. Both k and $\alpha$ may be pre-set or may be customizable based on a particular application. In an exemplary embodiment, a may be about 5 millimeters (mm).

The size parameter $\alpha$ determines the objects that the imaging device 110 will detect or ignore. The parameter $\alpha$ measures the size (area) size (area) of an object on a 2D plane. This means that a "large" object from far away can be the same size as a "small" object up close. However, there is a threshold of when the pool cleaner recognizes an object up close, but will not correct its path if it is out of its frame of reference. In some embodiments, the threshold may be 5 millimeters (mm). Small objects (sand, pebbles, other non-visible objects to the naked eye, etc.) would generally need to be clumped together, in order to increase their size (area), to be recognized.

$$g(d_i) = \exp\left(\frac{-\max(0, d_i - d_0)}{\beta}\right)$$

$g(d_i)$ represents a distance from the pool cleaner to a candidate piece of debris, with the $d_i$ being the distance to the candidate piece of debris, $d_0$ being a minimum distance to penalize, and $d_0 \geq 0$ and $\beta$ being a characteristic distance of candidate debris from the pool cleaner. In an exemplary embodiment, $\beta$ may be about 4 feet, but could be much larger. The numerator ($-\max(0, d_i - d_0)$) restricts the numerator to 0 or a negative number.

If $d < d_0$, g=1, there is no penalty. Otherwise, candidate debris at a larger distance will be penalized relative to candidate debris close to the pool cleaner. This is intended to strongly prioritize candidate debris that is immediately in front of (e.g., located adjacent to) the pool cleaner, which is always a desirable behavior. The relative penalty for candidate debris at a mid-range distance is determined by $\beta$. For $\beta = \infty$, there is no penalty for candidate debris far away from the pool cleaner. In practice, a large number will suffice for $\infty$. For many values of $\beta$, there will be a regime of candidate debris close to the pool cleaner that are strongly prioritized, and a regime of candidate debris further out that are assigned roughly the same weight, independent of distance.

The size and density, $f(A_i)$, and the distance, $g(d_i)$, to each candidate debris is summed for each piece of candidate debris along a particular path.

$$p(\Delta\theta_j) = \begin{cases} 1 & \text{if } |\Delta\theta_j| < \Delta_0 \\ (|\Delta\theta_j| - \Delta_0)\left(\frac{1 - p_{min}}{\Delta_{max} - \Delta_0}\right) & \text{otherwise} \end{cases}$$

$p(\Delta\theta_j)$ represents how smooth the motion is between the current path or trajectory and the potential path or trajectory to be taken (i.e., an angle deviation from the current path). In $p(\Delta\theta_j)$, $\Delta_0$ is a maximum angular deviation from the current trajectory such that there is no penalty applied for changing course, and $p_{min}$, is the minimum possible output value of $p(\Delta\theta)$. $p_{min} \geq 0$, and $\Delta_{max}$ is the maximum possible angular deviation due to a change in trajectory, which is a physical constraint.

This model for $p(\Delta\theta_j)$ allows for not penalizing a range of changes to the current trajectory if there is no change to the current trajectory. If $\Delta_0 = 0$, then any change to the current trajectory will be penalized and will linearly proportional to the change. If $\Delta_0 = \Delta_{max}$, then no penalty is applied to any change in trajectory.

After a search is performed over the space of possible paths or trajectories, the highest scoring path will be compared against a threshold score. If the best candidate path has a sufficiently high score, then the candidate path will be accepted and the pool cleaner 20 will change course accordingly (or remain on the same path, if the candidate path is the current path). As noted above, the pool cleaner 20 is continuously taking images and, thus, the steps 202-214 are continuously repeated to determine the best path or trajectory, as the best path or trajectory can change from image to image. Every time the pool cleaner takes a new image, the algorithm repeats steps 202 through 214 to determine the current best path (i.e., the path with the highest path score) and navigate to the next debris on that path. Before, during, or after removal of the candidate debris along the selected path, the pool cleaner 20 is again taking an image and repeating steps 202 through 214 to determine the current best path (i.e., the path with the highest path score) and determining to which debris the pool cleaner will next navigate. Steps 202 through 214 of FIG. 3 are repeated until all candidate debris is removed from the aquatic environment.

In summary, the control algorithms of the present invention assess all candidate paths or trajectories within the field of view of the camera 110 (or other imaging device) and determine a path or trajectory for the pool cleaner 20 based on the path score, which assesses the size and distance to debris along each path or trajectory and the smoothness of motion for each path or trajectory. Once a cleaning pathway has been determined, the controller 102 navigates the pool cleaner 20 along the pathway. In this manner, the largest and/or closest debris is generally removed first and the pool cleaner 20 continues to pick up the next largest and/or closest debris until the aquatic environment is free or nearly free of debris. The controller 102 navigates the pool cleaner 20 along one or more cleaning pathways until all of the debris is removed from the aquatic environment.

As noted above, the imaging device 110 is constantly taking images of the aquatic environment and retaining the images. The images may be stored within the memory 105 and/or the storage medium 106. In this manner, the control algorithm is constantly referencing historical data in the form of previous images (or frames) to compare the current image to one or more past images to assess the behavior of debris in those images. This is useful, for example, in the evaluation step 210 of FIG. 3. More particularly, the historical data can be used to assess whether objects have moved and/or other behavior of the objects to determine if the tracks or paths for those objects should be removed or retained as candidate debris. The historical data can also be utilized in any other manner to track feature or behavior of objects within the aquatic environment.

In some embodiments, the control algorithm may determine a singular pathway for removing the candidate debris from the aquatic environment. As noted above, the controller 102 will then navigate the pool cleaner 20 along the pathway until the aquatic environment is clean (all candidate debris is removed). In other embodiments, the control algorithm determines multiple potential pathways for removing candidate debris from the aquatic environment. The controller 102 will navigate the pool cleaner 20 along the pathway having the highest path score. In some embodiments, upon completing the pathway having the highest path score, the algorithm may reevaluate the aquatic environment to determine the next highest path score. The pool cleaner 20 may complete a pathway before beginning another pathway. In some embodiments, the algorithm determines a pathway having a higher path score while the pool cleaner 20 is navigating along a first pathway. The controller 102 may direct the pool cleaner 20 to begin a second pathway before a first pathway. This process may continue until all of the candidate debris is removed from the aquatic environment.

Use of the noted equation for calculating path scores for each candidate path (with candidate debris) is intended to address the following considerations:

Emphasizing large or dense debris: In some embodiments, f(A) may be tuned to relatively favor large candidate debris over small candidate debris. Clusters of candidate debris may be condensed into equivalent large objects or candidate debris for the purposes of evaluating path score.

Emphasizing close debris: In some embodiments, g(d) favors close candidate debris to a tunable extent. In other embodiments, there is no preference for close or far candidate debris, but there is never a preference for far candidate debris.

Smoothness of motion: In some embodiments, p(Δθ) offers a tunable penalty for changing course, including an option to not penalize a range about Δθ=0. In other embodiments, there is no penalty for changing course.

The control algorithm of FIG. 3 will now be described in an illustrative simplified example. First, scoring profiles may be utilized, for example, (1) shortsighted, in which the control algorithm strongly prioritizes close debris and gives normal priority for debris size, (2) shortsighted and greedy, in which the control algorithm strongly prioritizes close debris and strongly prioritizes large debris, (3) mid-sighted and greedy, in which the control algorithm moderately prioritizes close debris and strongly prioritizes large debris, and (4) egalitarian, in which the control algorithm weakly prioritizes close debris and gives normal priority for debris size. While particular scoring profiles are described, any number of and types of scoring profiles may be utilized.

Figure 17:
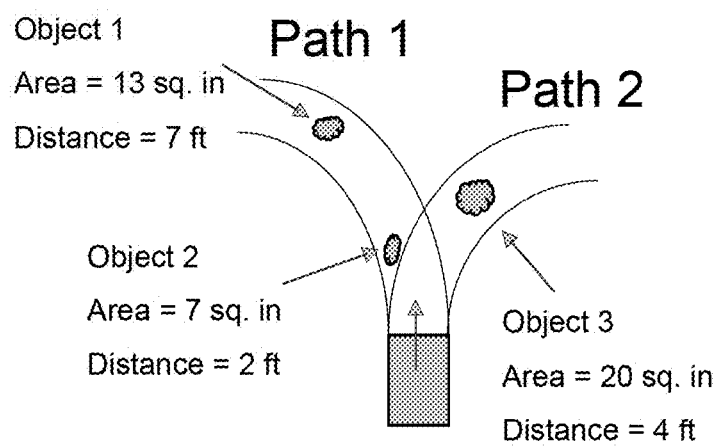
FIG. 17 is a diagram depicting an exemplary scoring strategy for potential paths (Path 1 and Path 2).

Using the scoring profiles described above, any example scoring strategy is determined for the potential paths (Path 1 and Path 2) depicted in FIG. 17. As can be seen from FIG. 17, Object 1 on Path 1 has an area of 13 square inches and is 7 feet from the pool cleaner, Object 2 on Path 1 has an area of 7 square inches and is 2 feet from the pool cleaner, and Object 3 on Path 2 has an area of 20 square inches and is 4 feet from the pool cleaner. Exemplary scoring for each of the scoring profiles (1)-(4) are shown in Table 1 below.

TABLE 1

| Scoring Profile | Object 1 Score | Object 2 Score | Object 3 Score | Path 1 Sum | Path 2 Sum |
| --- | --- | --- | --- | --- | --- |
| Shortsighted | 0.04 | 7 | 2 | 7.04 (i.e., 7) | 2 |
| Shortsighted & Greedy | 0.5 | 49 | 40 | 49.5 | 40 |
| Mid-sighted & Greedy | 38.7 | 49 | 225 | 87.7 | 225 |
| Egalitarian | 6.2 | 7 | 15 | 13.2 | 15 |

From Table 1, it can be seen that the path score sums and, thus, the trajectory or path taken is dependent upon the scoring profiles. For example, for the shortsighted scoring profile, Path 1 is chosen with a higher score of 7, for the shortsighted and greedy scoring profile, Path 1 is also chosen with a higher score of 49.5, for the mid-sighted and greedy scoring profile, Path 2 is chosen with a higher score of 225, and for the egalitarian scoring profile, Path 2 is selected with a higher score of 15.

Simulations

Simulations were created in a two-dimensional environment to determine what performance gains may be expected from a pool cleaner implementing the algorithm of FIG. 3 versus a random algorithm. In the simulation, a two-dimensional representation of the aquatic environment with debris therein was created and simulations of each of the two pool cleaners were utilized to clean the two-dimensional representation of the aquatic environment. By random algorithm, it is meant that the pool cleaner roams about the surface of the aquatic environment in a substantially straight line and, when the pool cleaner encounters a wall, the pool cleaner turns in a random direction and continues in substantially straight line in that direction. In the simulations, the pool cleaner continues in this manner (i.e., hitting walls, turning, and moving in a straight line) until the aquatic environment is clean. The simulations utilizing the random algorithm took over 78 minutes to remove 99% of the debris. In contrast, the simulations showed that 99% of the debris on the surface, namely the floor, of the aquatic environment was removed in a little under 15 minutes utilizing the algorithms disclosed herein.

Figure 14:
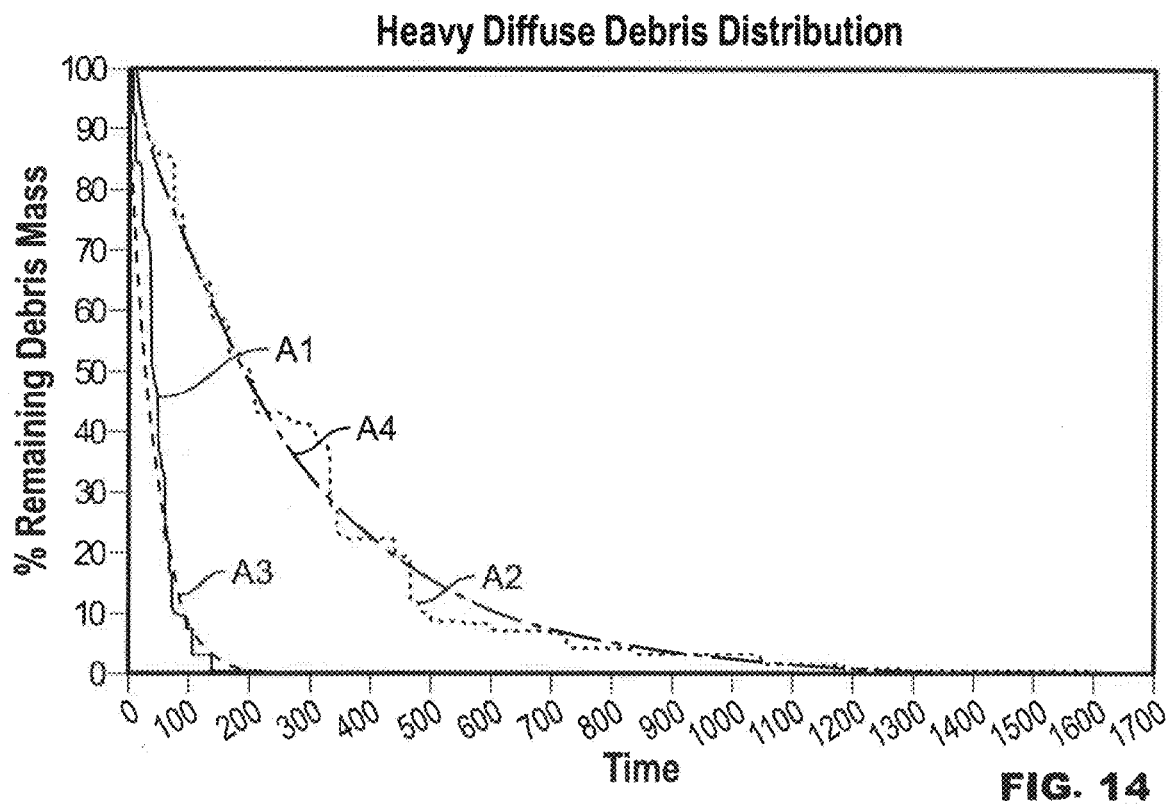
FIG. 14 is a graph depicting a percentage of remaining debris mass over time for a heavy diffuse debris distribution.
Figure 15:
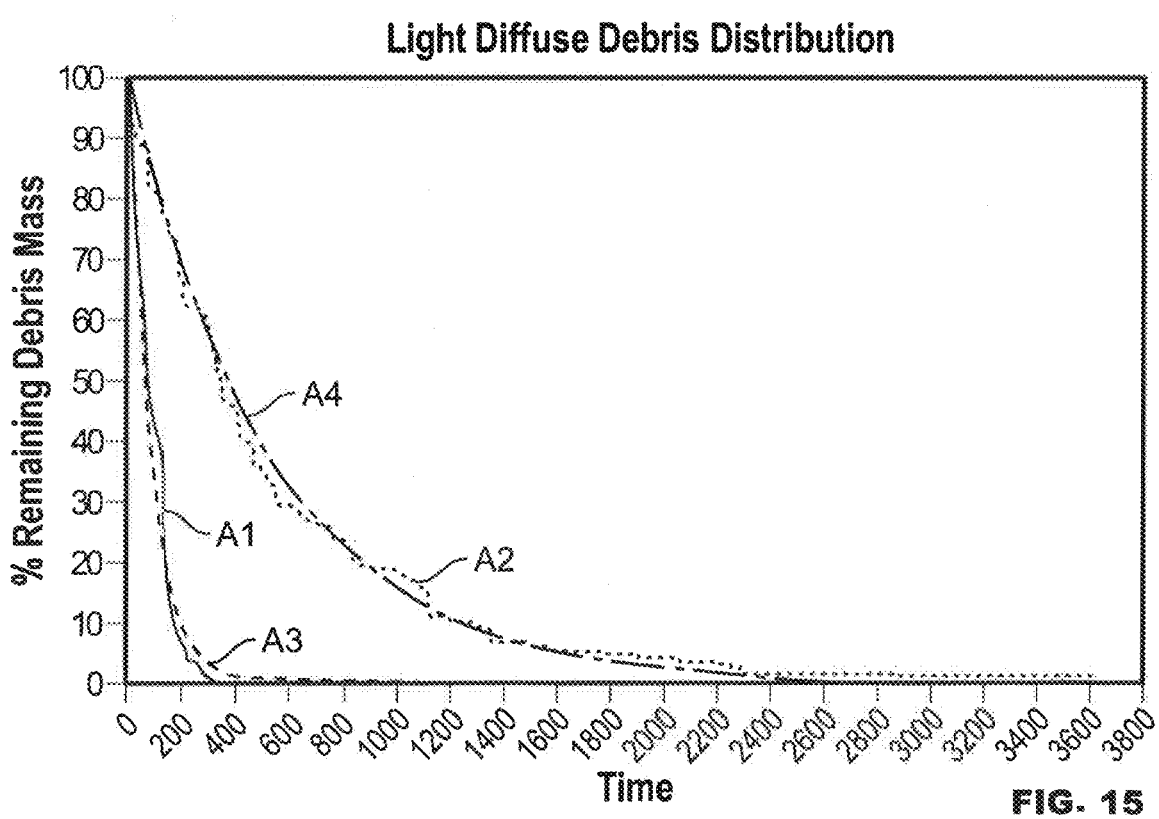
FIG. 15 is a graph depicting a percentage of remaining debris mass over time for a light diffuse debris distribution.

Simulated debris collection was also conducted on two different debris distributions with identical initial conditions. Referring to FIG. 14, a heavy debris distribution is depicted. In the heavy distribution, a simulation of a percentage of remaining debris mass is recorded over time for the algorithm in FIG. 3 (A1) and for the random algorithm described above (A2). Exponential fits are also included for both the algorithm of FIG. 3 (A3) and the random algorithm (A4). Similarly, a light debris distribution is depicted in FIG. 15. Again, a simulation of a percentage of remaining debris mass is recorded over time for the algorithm in FIG. 3 (A1) and for the random algorithm described above (A2). Exponential fits are also included for both the algorithm of FIG. 3 (A3) and the random algorithm (A4).

In summary, the graphs of FIGS. 14 and 15 show that, despite the debris distribution (i.e., heavy or light), pool cleaners implementing the algorithms disclosed herein are expected (using simulations) to be significantly faster at collecting debris than the straight path random algorithm described above. Using the exponential fits and the data from these graphs, the timescales to collect debris can be utilized. In fact, the timescale to collect debris is expected to be (through simulation) 6.72 times shorter for the algorithm of FIG. 3 relative to the random algorithm for the light debris distribution and the timescale to collect debris is expected to be (through simulation) 6.18 times shorter for the algorithm of FIG. 3 relative to the random algorithm for the heavy debris distribution.

The exponential fits of FIGS. 14 and 15 model data relatively well, but do have some shortcomings. More particularly, for the last about 1% to about 5% of remaining debris, the exponential fits for the algorithm of FIG. 3 (A3) underestimate the performance and the exponential fits for the random algorithm (A4) overestimate the performance. The fundamental question is how cleaning performance is qualified. If the main priority is to clean 95% of detectible debris within an aquatic environment, then the exponential fit is a good measurement and the graphs of FIGS. 14 and 15 and the cleaning times depicted therein would be accurate. However, if the metric is the length of time it takes to clean 99% of detectible debris, then the algorithm of FIG. 3 (A3) will perform better.

Figure 16:
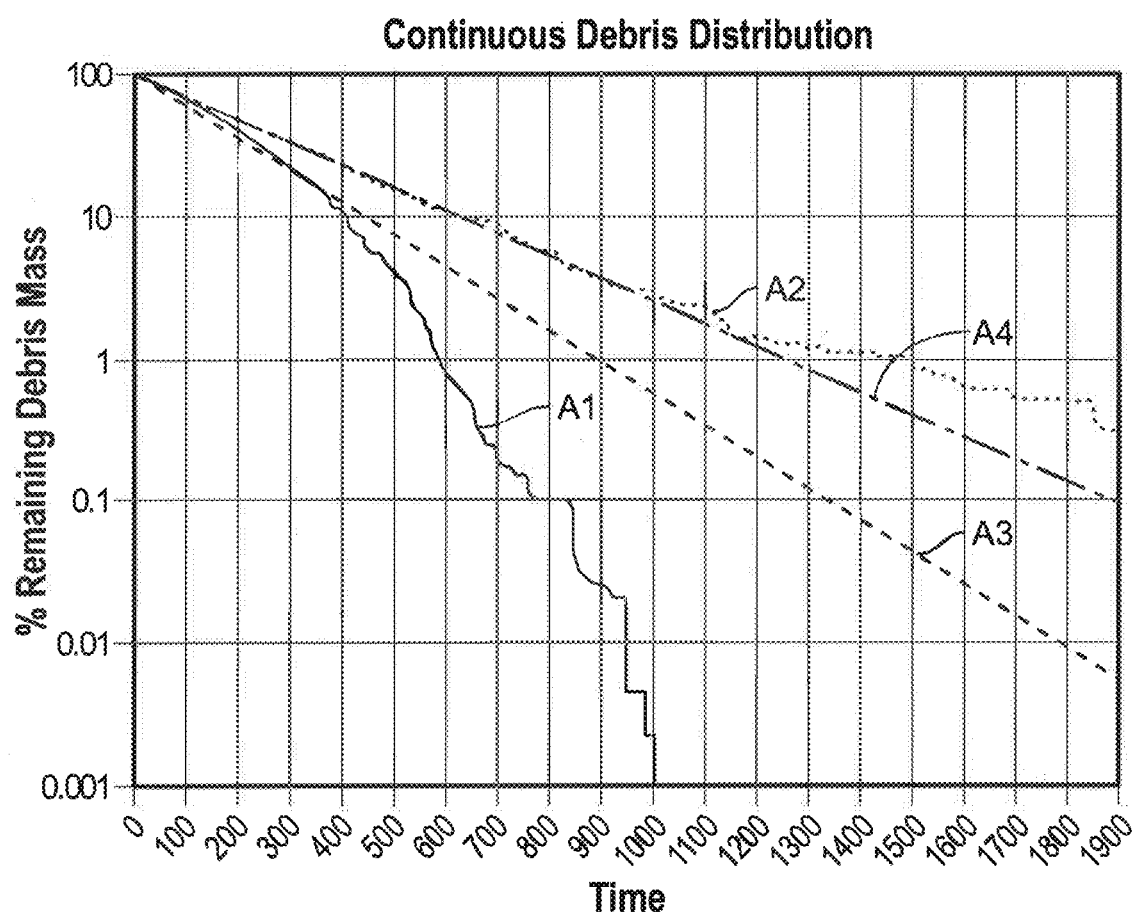
FIG. 16 is a graph depicting a percentage of remaining debris mass over time for a continuous debris distribution.

The size of an aquatic environment (i.e., a pool) and a distribution of the debris within the aquatic environment are also factors in determining relative performance. For example, a large pool with a few scattered leaves is an idea case for the algorithm of FIG. 3. More particularly, the algorithm of FIG. 3 will perform better than the random algorithm, as the algorithm of FIG. 3 will target and remove each of the scattered leaves in a time period that would be far less than that in the random algorithm, which would take more time to randomly find the few scattered leaves. Conversely, a small pool with a non-uniform debris distribution will not see as much benefit from the algorithm of FIG. 3. Initial tests with debris across the entire pool floor (that is smaller) yielded a cleaning time for the algorithm of FIG. 3 that was only about 2.5 times faster for 99% detectible debris removal than the cleaning time for the random algorithm, as seen in FIG. 16. Similar to FIGS. 14 and 15, FIG. 16 depicts a percentage of remaining debris mass recorded over time for the algorithm in FIG. 3 (A1) and for the random algorithm described above (A2). Exponential fits are also included for both the algorithm of FIG. 3 (A3) and the random algorithm (A4). As further seen in FIG. 16, the relative cleaning performance for algorithm of FIG. 3 (versus the random algorithm) improves as the pool becomes cleaner.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A pool cleaner control system, comprising:
a pool cleaner including an imaging device and a controller, the imaging device configured to acquire at least one image of an aquatic environment, the controller in communication with the imaging device, wherein the controller identifies candidate debris from the at least one image, analyzes at least two potential candidate debris-containing pathways, and determines which of the at least two potential candidate debris-containing pathways is an optimal cleaning pathway based on a degree to which the pool cleaner must angularly deviate from a current trajectory in order to follow a particular candidate debris-containing pathway.

2. The pool cleaner control system of claim 1, wherein the controller navigates the pool cleaner to the candidate debris along the optimal cleaning pathway.

3. The pool cleaner control system of claim 1, wherein the controller is further configured to assign a path score to each of the at least two potential candidate debris-containing pathways and select the optimal cleaning pathway.

4. The pool cleaner control system of claim 3, wherein the controller assigns the path score based on one or more of a size of the candidate debris, a distance of the candidate debris from the imaging device, or a smoothness of motion value.

5. The pool cleaner control system of claim 4, wherein the controller prioritizes the candidate debris that is closer to the imaging device when assigning the path score.

6. The pool cleaner control system of claim 4, wherein the controller prioritizes larger candidate debris when assigning the path score.

7. The pool cleaner control system of claim 4, wherein the controller prioritizes both larger candidate debris and the candidate debris that is closer to the imaging device when assigning the path score.

8. The pool cleaner control system of claim 4, wherein the controller prioritizes the size of the candidate debris over the distance of the candidate debris from the imaging device when assigning the path score.

9. The pool cleaner control system of claim 4, wherein the controller prioritizes the distance of the candidate debris from the imaging device over the size of the candidate debris when assigning the path score.

10. The pool cleaner control system of claim 4, wherein the controller reduces the path score based on the degree to which the pool cleaner must angularly deviate from the current trajectory in order to follow the particular candidate debris-containing pathway.

11. The pool cleaner control system of claim 1, wherein the controller is further configured to utilize non-debris historical data to determine whether a particular object in the aquatic environment is non-debris.

12. The pool cleaner control system of claim 1, wherein the controller is further configured to utilize candidate debris historical data to determine whether a particular object in the aquatic environment is the candidate debris.

13. A method of determining a path for a pool cleaner including an imaging device, the method comprising the steps of:
  acquiring one or more images in an aquatic environment using the imaging device;
  filtering out spots created by water surface movement from the one or more images;
  analyzing the one or more images to identify debris;
  identifying at least two potential debris-containing pathways in the aquatic environment based on the identified debris;
  determining which of the at least two potential debris-containing pathways is an optimal cleaning pathway; and
  navigating the pool cleaner to remove the debris along the optimal cleaning pathway.

14. The method of claim 13, wherein the step of analyzing one or more images to identify debris further comprises determining whether a particular object is removable debris by utilizing debris historical data.

15. The method of claim 13, wherein the step of analyzing one or more images to identify debris further comprises determining whether a particular object is non-debris by utilizing non-debris historical data.

16. The method of claim 13, further comprising calculating a score based on a distance from the pool cleaner to the identified debris.

17. The method of claim 13, further comprising calculating a path score for each of the at least two potential debris-containing pathways within the aquatic environment.

18. The method of claim 17, further comprising selecting the optimal cleaning pathway based on a highest path score of the at least two potential debris-containing pathways.

19. The method of claim 17, further comprising altering the path score of each of the at least two potential debris-containing pathways based a degree to which the pool cleaner must angularly deviate from a current trajectory in order to follow a particular candidate debris-containing pathway.

20. The method of claim 13, wherein the spots comprise effects caused by sun spots from surface ripples in the aquatic environment.

* * * * *